(12) United States Patent
Erickson et al.

(10) Patent No.: US 8,904,338 B2
(45) Date of Patent: Dec. 2, 2014

(54) PREDICTING PERFORMANCE OF A SOFTWARE PROJECT

(75) Inventors: Cheryl R. Erickson, Fort Wayne, IN (US); Paula C. Moss, Fort Wayne, IN (US); John J. Lipasek, Fort Wayne, IN (US); Roger L. Branson, Oviedo, FL (US); Timothy N. Jahren, Orlando, FL (US); John C. Bodenschatz, Fort Wayne, IN (US)

(73) Assignee: Raytheon Company, Waltham, MA (US)

( * ) Notice: Subject to any disclaimer, the term of this patent is extended or adjusted under 35 U.S.C. 154(b) by 534 days.

(21) Appl. No.: 13/156,030

(22) Filed: Jun. 8, 2011

(65) Prior Publication Data

US 2012/0317536 A1    Dec. 13, 2012

(51) Int. Cl.
*G06F 9/44* (2006.01)
*G06Q 10/06* (2012.01)

(52) U.S. Cl.
CPC .................................. *G06Q 10/0639* (2013.01)
USPC .......................................................... 717/101

(58) Field of Classification Search
USPC .......................................................... 717/101
See application file for complete search history.

(56) References Cited

U.S. PATENT DOCUMENTS

2003/0018952 A1\*  1/2003  Roetzheim ..................... 717/101
2003/0070157 A1\*  4/2003  Adams et al. ................. 717/101

OTHER PUBLICATIONS

Lawlor, "The Basics of Single Variable Linear Regression in Gretl", Jan. 16, 2006, p. 1-6.\*
Nguyen, "Improved Size and Effort Estimation Models for Software Maintenance", Dec. 1, 2010, p. 1-170.\*

\* cited by examiner

*Primary Examiner* — Li B Zhen
*Assistant Examiner* — Duy Khuong Nguyen
(74) *Attorney, Agent, or Firm* — Daly, Crowley, Mofford & Durkee, LLP (57) ABSTRACT

In one aspect, a method to predict performance of a software project includes determining, using a computer, performance estimates associated with at least one design count, the design count comprising at least one function point count, collecting actual performance data, comparing the performance estimates with the actual performance data, determining, using the computer, new performance estimates for a remainder of the software project in response to the actual performance data collected and refining a design of the software project based on the new performance estimates.

11 Claims, 5 Drawing Sheets

PREDICTING PERFORMANCE OF A SOFTWARE PROJECT

GOVERNMENT SPONSORED RESEARCH

This invention was made with the Government under Contract: W56 HZV-05-C-0724. The United States Government has certain rights in the invention.

BACKGROUND

Function points were defined in 1979 by Allan Albrecht of IBM to manage software. A function point is a unit of measurement to express the amount of business functionality an information system provides to a user. A function point approach assumes counting functions that specifically match requirements and counts external transactions such as external inputs, outputs, queries, number of data elements and file size allocations for example.

SUMMARY

In one aspect, a method to predict performance of a software project includes determining, using a computer, performance estimates associated with at least one design count, the design count comprising at least one function point count, collecting actual performance data, comparing the performance estimates with the actual performance data, determining, using the computer, new performance estimates for a remainder of the software project in response to the actual performance data collected and refining a design of the software project based on the new performance estimates.

In another aspect, an apparatus to predict performance of a software project includes circuitry to determine performance estimates associated with at least one design count, the design count comprising at least one function point count and to determine new performance estimates for a remainder of the software project in response to a comparison of actual performance data and the performance estimates.

In a further aspect, an article includes a non-transitory machine-readable medium that stores executable instructions to predict performance of a software project. The instructions cause a machine to determine performance estimates associated with at least one design count, the design count comprising at least one function point count and to determine new performance estimates for a remainder of the software project in response to a comparison of actual performance data and the performance estimates.

DETAILED DESCRIPTION

Described herein are techniques for estimating performance in a project. In particular, the techniques described herein use design counts such as function point (FP) analysis for resource prediction. These techniques result in a shift from a reactive approach to a proactive approach and provide an early predictive analysis without developing a simulation for each aspect of a system. The techniques also use basic iterative approaches to reapply learned information, as well as measurements from program executions, to refine the end estimations. In one particular example, function point analysis is correlated with collected measurements to model the end estimate. The techniques described herein support real-time and non-real-time applications.

While the techniques used herein use Technical Performance Measurements (TPMs) as an example of performance data to measure, the techniques described herein are not isolated to TPM but may be applied to any performance data. TPMs used in software management have historically been based on gathering metrics from program executions. TPMs currently focus on measuring and making adjustments after results are tabulated (e.g., bottom-up vs. top down). This historical approach results in reacting to the results so that there is currently no standard mechanism in place to assist in predicting future results.

As used herein a function point is a unit of measurement to express the amount of business functionality an information system provides to a user. The cost (in dollars or hours) of a single unit is calculated from past projects.

Figure 1:
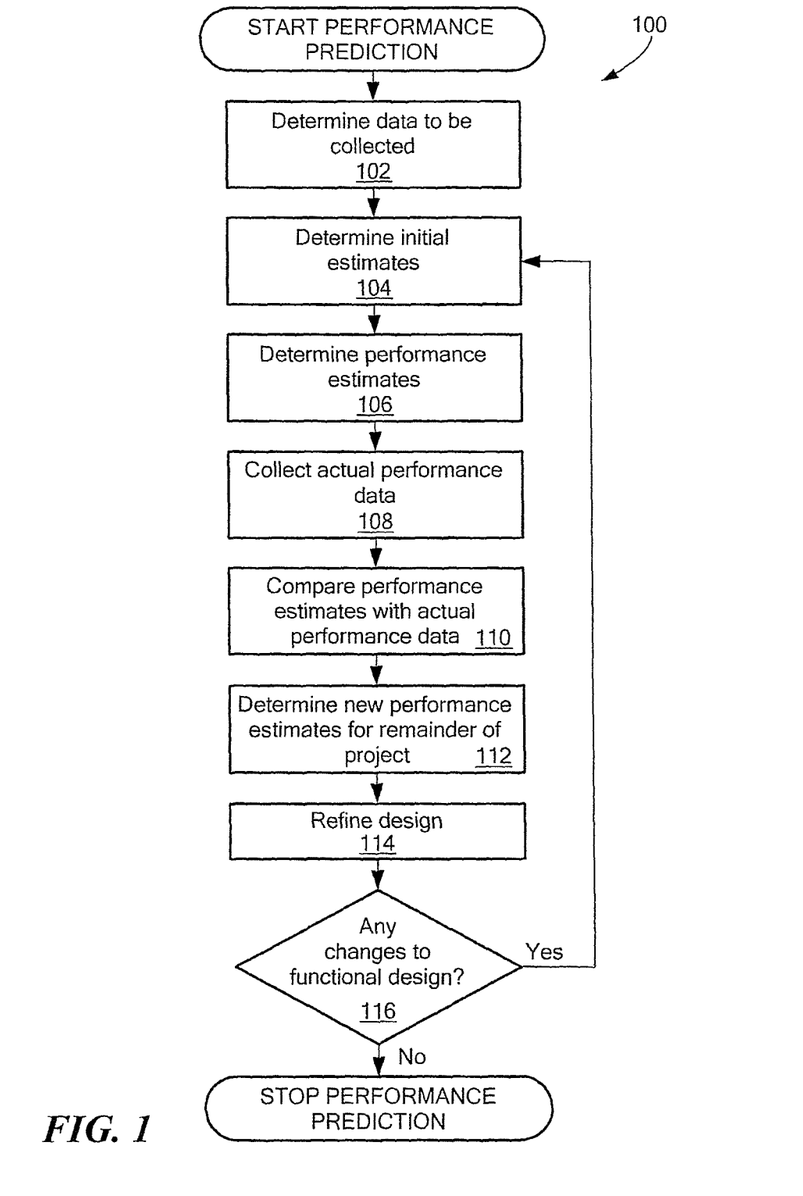
FIG. 1 is a flowchart of an example of a process to predict performance in a software project.

Referring to FIG. 1, an example of a process to estimate performance of a software project is a process 100. Process 100 determines data to be collected (102). For example, data may be derived from project requirements. In another example, TPMs are identified and defined as well as data to support the TPMs (e.g., units of measure, testing criteria and environment, and data required to derive the TPM).

Process 100 determines initial estimates (104). Processing block 104 determines an initial estimate of the contribution of each estimation criteria identified as contributing to the TPM. The first time through this processing block 104, the initial estimates for contribution are set before actual measurements are made. As process 100 continues through the steps, actual measurements are collected and the contributions can be recalculated. Process 100 returns to this step 104 to reset the value of contribution of each of the estimation criteria. As design changes are made and functionality is added to the system, process 100 returns to this step 104 to make a new estimate of the TPM.

For example, a TPM estimate is a function of estimation criteria, i.e. Resource Utilization Estimate=F(estimation criteria). Estimation criteria can be function points (FPs), lines of code, number of requirements, and so forth. One or more estimation criteria can be used as a function variable. Each estimation criteria makes a contribution to the TPM estimate. Before actuals are measured for a TPM, the initial estimation of the TPM is based on an estimated individual contribution of each of the estimation criteria used. The initial estimated contribution of the estimation criteria is determined to make the initial TPM estimate before actual measurements are made. For example, the initial estimated contribution could be from historic program data, or, as simple as, TPM target value divided by total estimation criteria. The estimated criteria should not be zero since an estimation criteria exists as non-zero by definition so that zero would imply that there is no contribution, thus no TPM to measure.

For example, TPM CPU Utilization Estimate=F(FPs), i.e. a function of the number of function points. Each function point makes a contribution to the CPU utilization estimate. At the beginning of the program, the engineering team only has the function point count available as derived from the top level of functional modeling. Actual measurements of the TPM for CPU utilization have not been made. A similar program determined that each FP contributed 1 SPECInt of CPU utilization at the same level of functional modeling. The engineering team then uses this historic data as the initial estimation criteria contribution. So, if the new model has a total count of 1000 FPs, the TPM estimation for CPU utilization is 1000 SPECInts (i.e. (1 SPECInt per FP)×1000 FPs). When the first TPM measurements are made, the contributions per FP is refined and recalculated, and a more accurate estimate of the final TPM can be estimated. This process is repeated as new functionality or design changes are made.

The initial estimates are defined for each estimation criteria data to be collected or reused (e.g., function point (FP) counts and TPMs). For example, a project might start from scratch and have no base for an FP contribution to a selected TPM. In this case, an initial estimate may be skewed heavily to one side or the other. In one particular example, FP contributions from a similar project may be selected as the initial estimate.

The first actual TPM measurements may also be skewed because the first software build may have a common infrastructure running but not counted in the FP method at higher model levels. Initially, the common infrastructure may represent a higher percentage of resource usage than that of the final product. Recognizing lower levels of modeling that do count the common infrastructure, detail counts will help to refine the accuracy of the FP contribution to the performance prediction earlier in the life cycle.

Process 100 calculates performance estimates (106). For example, an FP count and an estimation based on the FP count are calculated (see, for example, FIGS. 2 and 3).

Process 100 collects actual performance data (108). For example, the data determined in processing block 102 are collected. In one example, the data that is collected is associated with the TPMs. In one particular example, CPU usage, volatile and non-volatile memory are selected as project TPMs. Methods of what and how to measure the TPMs are selected. These selected methods are used for the duration of the project. Test cases are written so that the data collection is consistent. Tests are run based on the choice of how to exercise and to load system. For example, test runs may be for nominal loading, stress loading and so forth.

Measurements are collected for each component or service and for the project defined in processing block 102. The maximum value collected for each of the items is used to identify the measurement collected for that software build (also called a software release) and then used as an input value to refine and calculate future estimations.

In one particular example, the data is collected automatically using a computer.

Process 100 compares performance estimates with actual performance (110). For example, a project team reviews the performance prediction estimates for the future and final product, in one example, resource utilization. Analysis would indicate whether the final product expects to meet the TPMs. For example, use of FP counting and curve fit techniques can result in higher confidence estimates for CPU usage, aligning well with the SLOC curve fit estimates.

Process 100 refines estimation criteria (112). For example, with each new set of TPM measurements, the remaining software builds are recalculated based on the contributions of the FPs of this round of estimates. Process 100 repeats processing block 106, for example, to recalculate the FP contributions based on the new TPM measurements.

Process 100 refines the design (114). For example, if no functional design changes have been made, but a new build of software has been made, new actual TPMs are collected. Process 100 repeats processing block 108 to collect new actual performance data.

Upon analysis of the performance prediction, a design team may decide to refine the design to meet TPMs goals. Refinement of the design may include reallocation of software, using common library routines and so forth. If the functional design is refined, the initial estimate, for example function points, may need to be reviewed, modified, and recounted.

Process 100 determines if there are any changes to functional design (116). If there are any changes to the functional design, then process 100 returns to processing block 104.

If there are no changes to the functional design, then the performance prediction cycle is complete.

Figure 2:
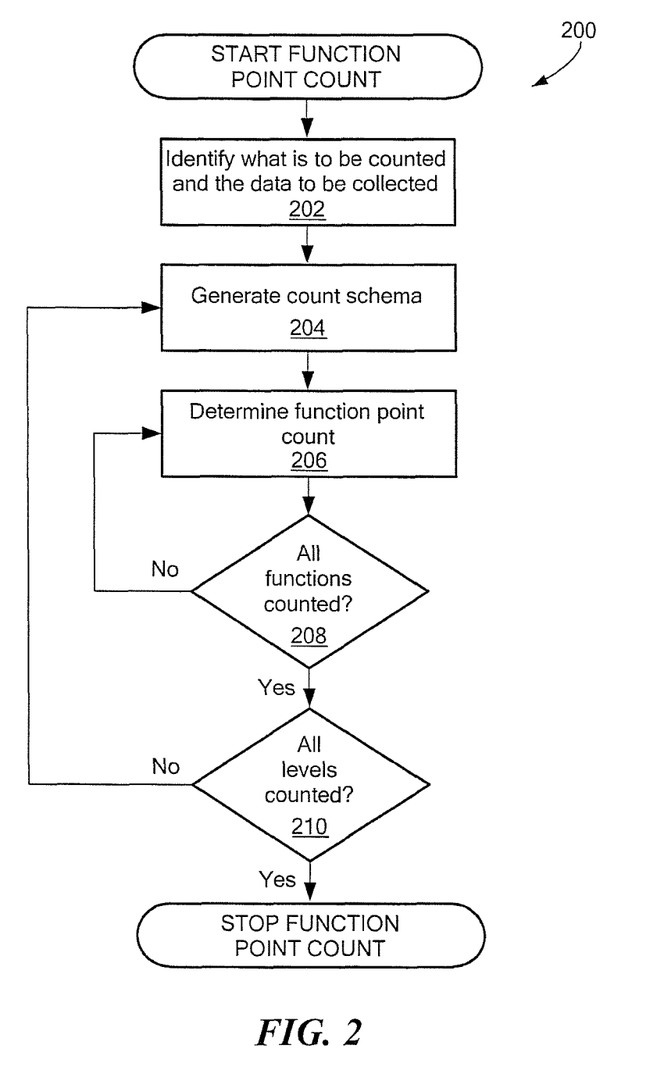
FIG. 2 is a flowchart of an example of a process to determine a function point count.

Referring to FIG. 2, one example to determine FP counts is a process 200. Process 200 identifies what is to be counted and data to be collected (202). For example, an estimation team identifies the model level and functions for which function points will be counted. The lower the level of model detail, the more accurate the count will be and will result in a better computed contribution per function point.

The estimation team also determines category types to be collected and identified, so that the function point counts can be distributed over categories as required for the program. For example, applications may run on multiple platforms. Each platform would need to be identified with specific applications, so function points for the running applications can be identified for predicting resource utilizations on each platform.

Process 200 generates count schema (204). A counting schema is defined to facilitate easy collection, archiving, and computation of the counts. In one example, a spreadsheet or relational database support is used. In one particular example, a function points MICROSOFT® EXCEL® workbook template with algorithms embedded to rate and compute the function point count is used. The estimation team modifies the workbook for project information and additional categories of data to be collected.

Process 200 determines function point count (206). For example, rules for counting function points known in the prior art are used. In one particular example, project specific weighting factors may be determined to apply to the counts for the project.

Process 200 determines if all functions are counted (208). If all functions have not been counted at this level, then process 200 repeats processing block 206. If all functions have been counted at this level, then process 200 determines if all levels have been counted (210). If all levels have not been counted, then process 200 repeats processing blocks 204 and 206.

Figure 3:
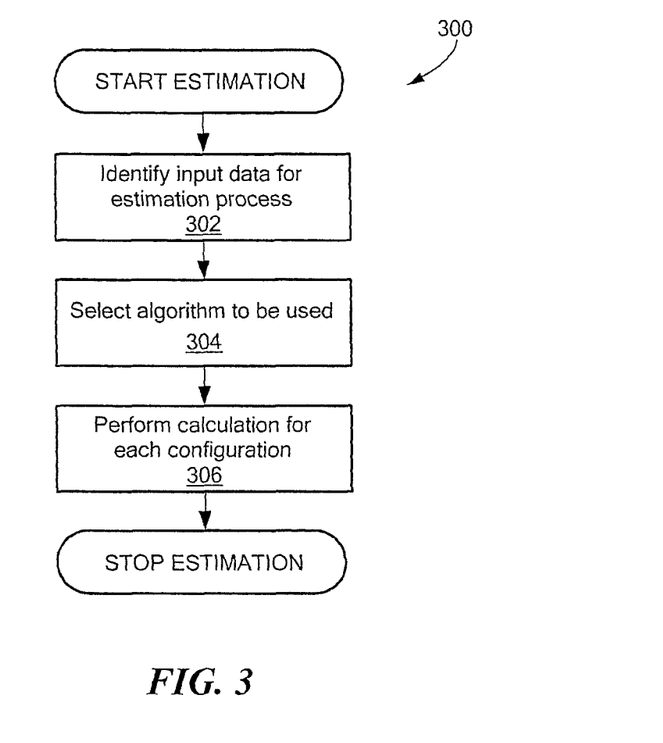
FIG. 3 is a flowchart of an example of a process to perform estimation.

Referring to FIG. 3, an example of a process to perform an estimation is a process 300. Process 300 performs the estimation using the FP count (determined in process 200) and actual measurements (e.g., TPM measurements) collected (e.g., from processing block 108) to estimate a value of resource units per contributing FP count.

Process 300 identifies input data for estimation (302). For example, the input data identified in processing block 102 is used. The estimation team looks at the input data and revises the list if required. The estimation team then collects the data or links to the data to be used, for example, completed function point counts and actual TPMs.

Process 300 selects an algorithm to be used (304). For example, after analyzing the variables and type of data available, an appropriate algorithm is selected for the data and type of prediction desired. In one particular example, a least squares curve fit is selected using a single variate or multi-variate approach.

Single-variate approach uses computed values of a and b to compute new TPM predictions using y=a+bx, where y is TPM predicted value, a and b are least squares curve fit values, and x is design count. In one example, FP count is the recommended design count used, but any other chosen variable like software lines of code (SLOC) or database size can be used.

Multi-variate approach uses computed values of a, $b_1$, $b_2$, ..., $b_n$ to compute new TPM predictions using y=a+$b_1 x_1$+$b_2 x_2$+ ... +$b_n x_n$, where y is TPM predicted value, a and $b_1$, $b_2$, ..., $b_n$ are least squares curve fit values, and $x_1$, $x_2$, ..., $x_n$ are design counts. In one example, FP count is the design count used, but any other chosen variable like SLOC or database size can be used. In some examples, n=1 or 2, but n can be as large as needed if many different design parameters are included.

Process 300 performs calculation for each configuration (306). For example, the selected algorithm is used to calculate the estimation curve and predict values at future points in the project development.

In one particular example, the least-squares single variate line uses a straight line of the form y=a+bx to approximate the given set of data $(x_1, y_1), (x_2, y_2), \ldots, (x_n, y_n)$ where n≥2.

For least squares, a and b are chosen to minimize the square of the error, and are defined by $$a = \frac{(\sum y)(\sum x^2) - (\sum x)(\sum xy)}{n\sum x^2 - (\sum x)^2} \text{ and}$$

$$b = \frac{n\sum xy - (\sum x)(\sum y)}{n\sum x^2 - (\sum x)^2}, \text{ where}$$

$$\sum \ldots = \sum_{i=1}^{n} \ldots i,$$

y=measured values (e.g., TPM measured values), x=Function Point counts, and n=number of data points for which there are measured Data and Function Point counts.

In one particular example, MICROSOFT® EXCEL® automatically calculates least squares curve fits with the LINEST function using the form LINEST ($y_1$:$y_n$, $x_1$:$x_n$) where y and x are defined above. The LINEST function returns values for a and b using the values provided for $x_1$, ..., $x_n$ and $y_1$, ..., $y_n$.

For our example, the least-squares multi-variate line uses a straight line of the form y=a+$b_1 x_1$+ ... +$b_n x_n$, where a and $b_1$, ..., $b_n$ are chosen to minimize the square of the error and y=measured values (e.g., TPM measured values), $x_1$, ..., $x_n$ are the design counts used to aid in prediction of the values (e.g., FP counts, SLOC counts, database size, and so forth). For this example, it is assumed that only 2 variables are used thus n=2. For n=2 the equation becomes y=a+$b_1 x_1$+$b_2 x_2$. In one example, n=2 and the two variables are FP counts and SLOC counts.

MICROSOFT® EXCELS automatically calculates least squares multi-variate curve fits with the LINEST function using the form LINEST($y_1$:$y_n$, $x_{11}$:$x_{2n}$) where y=TPM measured values and $x_{11}$, ..., $x_{1n}$ is the first independent variable (FP counts) and $x_{21}$, ..., $x_{2n}$ is the second independent variable (SLOC count). The LINEST function returns values for a, $b_1$, and $b_2$ using the values provided for $x_{11}$, ..., $x_{1n}$; $x_{21}$, ... $x_{2n}$; and $y_1$, ..., $y_n$.

Figure 4:
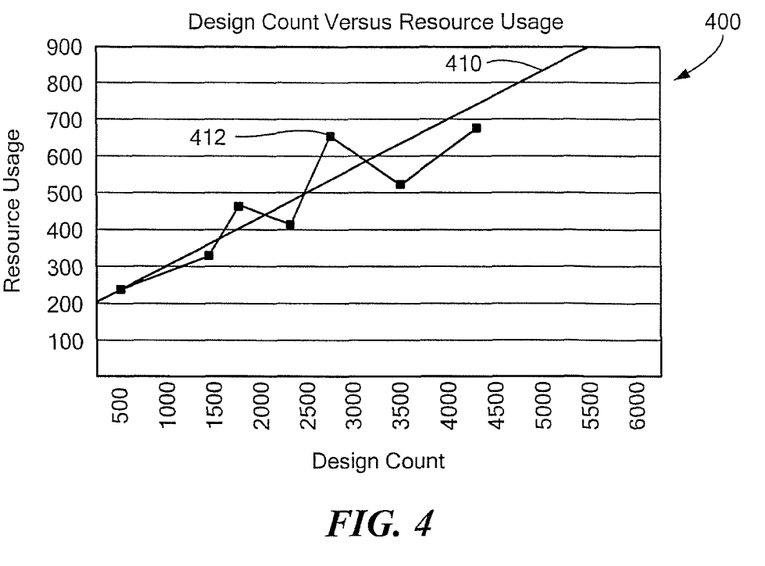
FIG. 4 is an example of graph depicting a relationship between design count and resource usage.

Referring to FIG. 4, a graph 400 describes a relationship between design count and resource usage. The graph 400 includes a least squares curve 410 and measured resource usage 412. FIG. 4 describes an example of how TPM estimates are developed. First, a least squares curve fit is conducted between resource usage and the design count used (e.g., Function Point or SLOC). The resource usage is a measured value, while the design count is tabulated by a design team based on a review of the system architecture, use case diagrams, and the overall scope of the effort. Using these two values, a least squares estimation is derived which defines the best line (the curve 410) defining the relationship between resource usage and design count while minimizing the square of the distance between individual measured values of resource usage and tabulated values of the design count.

Figure 5:
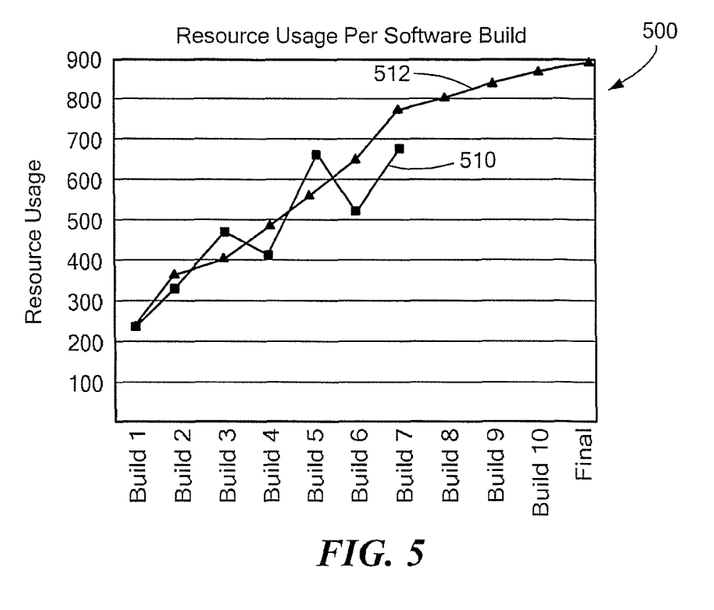
FIG. 5 is an example of a graph depicting a relationship between resource usage per software build based on FIG. 4.

Referring to FIG. 5, the linear relationship derived in FIG. 4 between resource usage and design count is used to determine estimated values for each SW build (release). For example, a graph 500 of the resource usage per software build includes an estimated usage curve 512 and the actual usage curve 510. The design count for each SW build is tabulated by the design team and the design count for each SW build is then used to determine an estimated resource usage value for that SW build using the linear relationship defined in FIG. 4. For example, in the table following, the design team determines the design count for each build. The resource estimate is taken from the curve 410 in FIG. 4 based on the design count.

| Build | Design Count | Resource Estimate |
|-------|--------------|-------------------|
| 1     | 500          | 220               |
| 2     | 1450         | 365               |
| 3     | 1600         | 405               |
| 4     | 2475         | 495               |
| 5     | 2600         | 540               |
| 6     | 3500         | 650               |
| 7     | 4400         | 770               |
| 8     | 4800         | 800               |
| 9     | 5100         | 840               |
| 10    | 5300         | 880               |
| Final | 5500         | 900               |

Figure 6:
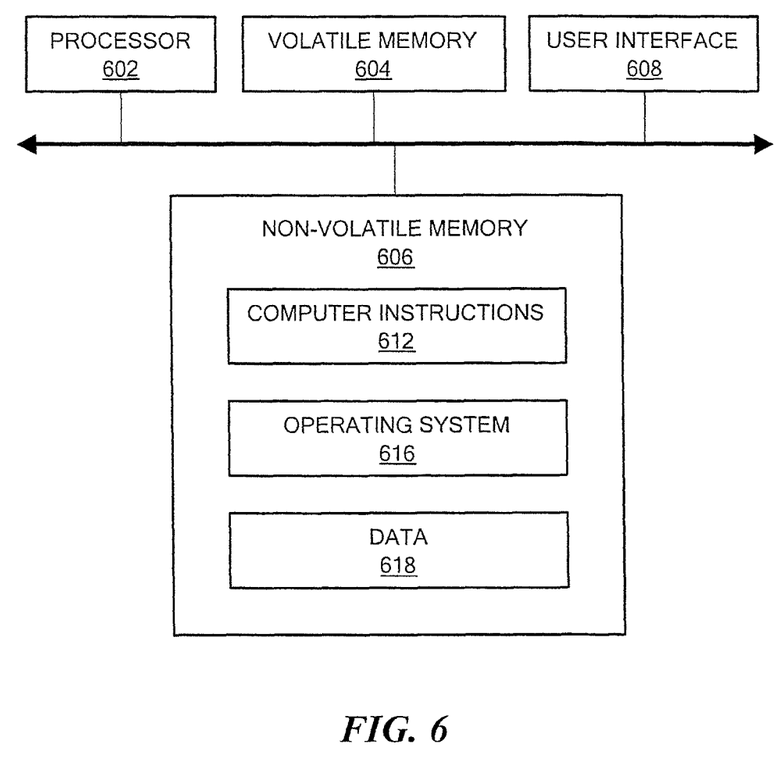
FIG. 6 is a computer on which any of the processes of FIGS. 1 to 3 may be implemented.

Referring to FIG. 6, a computer 600 may be used to one or more processing blocks of the processes described herein (e.g., the processes 100, 200, 300). The computer 600 includes a processor 602, a volatile memory 604, a non-volatile memory 606 (e.g., hard disk), for example, and a user interface (UI) 608 (e.g., a mouse, a keyboard, a touch screen and so forth). In other examples of a computer 600, the UI 608 may not be included. Non-volatile memory 606 includes an operating system 616; data 618; and computer instructions 612 which are executed out of volatile memory 604 to perform all or part of processes 100, 200, 300.

The processes described herein (e.g., processes 100, 200, 300) are not limited to use with the hardware and software of FIG. 6; they may find applicability in any computing or processing environment and with any type of machine or set of machines that is capable of running a computer program. The processes may be implemented in hardware, software, or a combination of the two. The processes may be implemented in computer programs executed on programmable computers/machines that each includes a processor, a storage medium or other article of manufacture that is readable by the processor (including volatile and non-volatile memory and/or storage elements), at least one input device, and one or more output devices. Program code may be applied to data entered using an input device to perform one or more of the processing blocks of the processes 100, 200, 300, for example, and to generate output information.

The processes described herein are not limited to the specific embodiments described herein. For example, the processes are not limited to the specific processing order of the process steps in FIGS. 1 to 3. Rather, any of the processing steps of FIGS. 1 to 3 may be re-ordered, combined or removed, performed in parallel or in serial, as necessary, to achieve the results set forth above.

Process steps in FIGS. 1 to 3 associated with implementing the system may be performed by one or more programmable processors executing one or more computer programs to perform the functions of the system. All or part of the system may be implemented as, special purpose logic circuitry (e.g., an FPGA (field programmable gate array) and/or an ASIC (application-specific integrated circuit)).

While the invention is shown and described in conjunction with a particular embodiment having an illustrative architecture having certain components in a given order, it is understood that other embodiments well within the scope of the invention are contemplated having more and fewer components, having different types of components, and being coupled in various arrangements. Such embodiments will be readily apparent to one of ordinary skill in the art. All documents cited herein are incorporated herein by reference. Other embodiments not specifically described herein are also within the scope of the following claims.

What is claimed is:

1. A method to predict performance of a software project, comprising:
    a) determining, using a computer, performance estimates associated with at least one design count, the design count comprising at least one function point count;
    b) collecting actual performance data;
    c) comparing the performance estimates with the actual performance data;
    d) determining, using the computer, new performance estimates for a remainder of the software project in response to the actual performance data collected; and
    e) refining a design of the software project based on the new performance estimates,
    wherein determining the performance estimate comprises, in a single-variate implementation, using a least-squares single variate line of the form y=a+bx to determine the performance estimate,
    where y is a predicted value, a and b are least squares curve fit values, and x is a design count,
    wherein a and b are chosen to minimize a square of the error, and are defined by:

$$a = \frac{(\sum y)(\sum x^2) - (\sum x)(\sum xy)}{n\sum x^2 - (\sum x)^2} \text{ and}$$

$$b = \frac{n\sum xy - (\sum x)(\sum y)}{n\sum x^2 - (\sum x)^2}, \text{ where}$$

$$\sum \ldots = \sum_{i=1}^{n} \ldots i,$$

y=measured values, x is the design count, and n=number of data points for which there are measured data and design counts and n is greater than zero.

2. The method of claim 1 wherein, in a multi-variate implementation, determining the performance estimate comprises using a least-squares multi-variate line of the form y=a+b$_1$x$_1$+ . . . +b$_n$x$_n$ to determine the performance estimate, where a and b$_1$, . . . , b$_n$ are chosen to minimize a square of the error and y=measured values, x$_1$, . . . , x$_n$ are the design counts.

3. The method of claim 2 wherein the least-squares multi-variate line is of the form y=a+b$_1$x$_1$+b$_2$x$_2$,
    wherein n=2 and the design counts are a function point (FP) count and a software lines of code (SLOC) count.

4. The method of claim 1, further comprising:
    f) determining if there are any changes to the functional design based on refining the design; and
    g) repeating steps a) to f).

5. An apparatus to predict performance of a software project comprising:
    circuitry to:
        determine performance estimates associated with at least one design count, the design count comprising at least one function point count;
        determine new performance estimates for a remainder of the software project in response to a comparison of actual performance data and the performance estimates; and
        refine a design of the software project based on the new performance estimates,
    wherein the circuitry to determine the performance estimate comprises, in a single-variate implementation, circuitry to use a least-squares single variate line of the form y=a+bx to determine the performance estimate,
    where y is a predicted value, a and b are least squares curve fit values, and x is a design count,
    wherein a and b are chosen to minimize a square of the error, and are defined by:

$$a = \frac{(\sum y)(\sum x^2) - (\sum x)(\sum xy)}{n\sum x^2 - (\sum x)^2} \text{ and}$$

$$b = \frac{n\sum xy - (\sum x)(\sum y)}{n\sum x^2 - (\sum x)^2}, \text{ where}$$

$$\sum \ldots = \sum_{i=1}^{n} \ldots i,$$

y=measured values, x is the design count, and n=number of data points for which there are measured data and design counts and n is greater than zero.

6. The apparatus of claim 5 wherein the circuitry comprises at least one of a processor, a memory, programmable logic and logic gates.

7. The apparatus of claim 5 wherein, in a multi-variate implementation, the circuitry to determine the performance estimate comprises circuitry to use a least-squares multi-variate line of the form y=a+b$_1$x$_1$+ . . . +b$_n$x$_n$ to determine the performance estimate, where a and b$_1$, . . . , b$_n$ are chosen to minimize a square of the error and y=measured values, x$_1$, . . . , x$_n$ are the design counts.

8. The apparatus of claim 7 wherein the least-squares multi-variate line is of the form y=a+b$_1$x$_1$+b$_2$x$_2$,
    wherein n=2 and the design counts are a function point (FP) count and a software lines of code (SLOC) count.

9. An Article comprising:
    a non-transitory machine-readable medium that stores executable instructions to predict performance of a software project, the instructions causing a machine to:

determine performance estimates associated with at least one design count, the design count comprising at least one function point count;

determine new performance estimates for a remainder of the software project in response to a comparison of actual performance data and the performance estimates; and refine a design of the software project based on the new performance estimates, wherein the instructions to determine the performance estimate comprises, in a single-variate implementation, instructions to use a least-squares single variate line of the form y=a+bx to determine the performance estimate, where y is a predicted value, a and b are least squares curve fit values, and x is a design count, wherein a and b are chosen to minimize a square of the error, and are defined by:

$$a = \frac{(\sum y)(\sum x^2) - (\sum x)(\sum xy)}{n\sum x^2 - (\sum x)^2} \text{ and}$$

$$b = \frac{n\sum xy - (\sum x)(\sum y)}{n\sum x^2 - (\sum x)^2}, \text{ where}$$

$$\sum \ldots = \sum_{i=1}^{n} \ldots i,$$

y=measured values, x is the design count, and n=number of data points for which there are measured data and design counts and n is greater than zero.

10. The apparatus of claim 9 wherein the instructions to determine the performance estimate comprises, in a multi-variate implementation, instructions to use a least-squares multi-variate line of the form $y=a+b_1x_1+ \ldots +b_nx_n$ to determine the performance estimate, where a and $b_1, \ldots, b_n$ are chosen to minimize a square of the error and y=measured values, $x_1, \ldots, x_n$ are the design counts.

11. The apparatus of claim 10 wherein the least-squares multi-variate line is of the form $y=a+b_1x_1+b_2x_2$, wherein n=2 and the design counts are a function point (FP) count and a software lines of code (SLOC) count.

* * * * *